Figure 1:
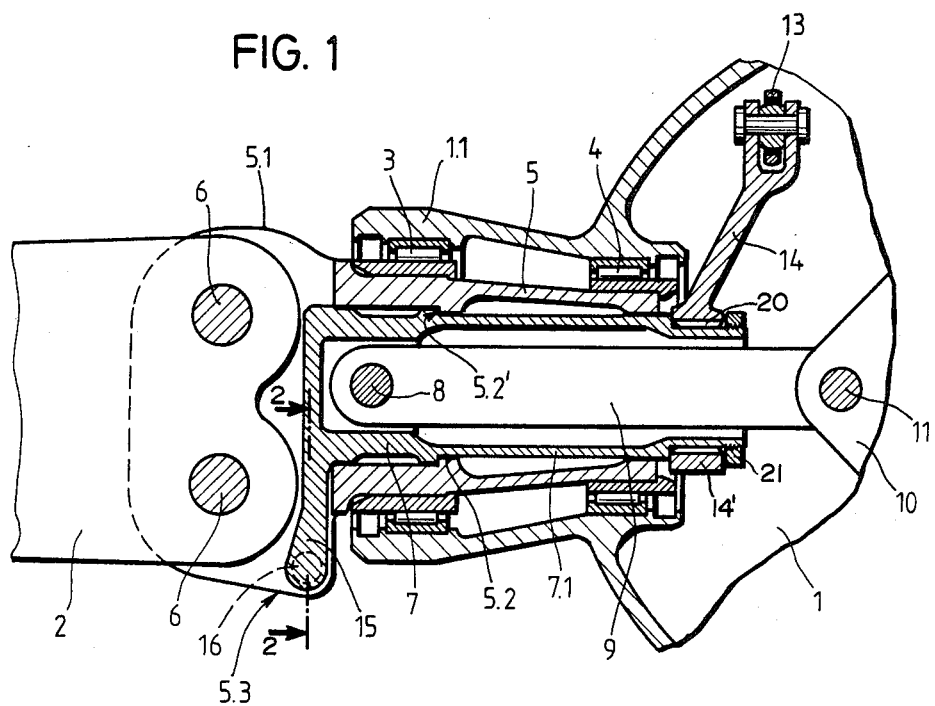

United States Patent [19]

Schwarz et al.

[11] Patent Number: 4,545,733
[45] Date of Patent: Oct. 8, 1985

[54] APPARATUS FOR ADJUSTING THE TRACKING OF THE BLADES IN A ROTOR, ESPECIALLY FOR A ROTARY WING AIRCRAFT

[75] Inventors: Alois Schwarz, Putzbrunn; Karlheinz Mautz, Ottobrunn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 474,044

[22] Filed: Mar. 10, 1983

[30] Foreign Application Priority Data

Mar. 18, 1982 [EP] European Pat. Off. ........ 82102202.7
Mar. 18, 1982 [EP] European Pat. Off. ........ 82102203.5

[51] Int. Cl.⁴ ............................................. B64C 27/48
[52] U.S. Cl. ....................................... 416/138; 416/61; 416/134 A
[58] Field of Search ................. 416/61, 158, 134 A, 416/138 A

[56] References Cited

U.S. PATENT DOCUMENTS

| | | | |
|---|---|---|---|
| 1,995,460 | 3/1935 | Pecker | 416/134 A |
| 2,369,048 | 2/1945 | Hays | 416/134 A |
| 3,008,525 | 11/1961 | Jensen | 416/61 |
| 3,227,220 | 1/1966 | You | 416/134 A |
| 3,227,221 | 1/1966 | You | 416/158 X |
| 3,292,712 | 12/1966 | Schmidt | 416/134 A X |
| 3,415,324 | 12/1968 | Austin | 416/61 |
| 3,736,010 | 5/1973 | Larkin | 416/61 X |
| 4,099,892 | 7/1978 | Martin | 416/134 A |
| 4,432,696 | 2/1984 | Stephan et al. | 416/134 A |

FOREIGN PATENT DOCUMENTS

| | | |
|---|---|---|
| 1531355 | 3/1971 | Fed. Rep. of Germany . |
| 2150741 | 11/1973 | Fed. Rep. of Germany . |
| 2757617 | 6/1979 | Fed. Rep. of Germany ...... 416/158 |
| 2811678 | 9/1979 | Fed. Rep. of Germany ........ 416/61 |
| 3006088 | 8/1981 | Fed. Rep. of Germany . |
| 2658828 | 2/1982 | Fed. Rep. of Germany . |

Primary Examiner—Everette A. Powell, Jr.
Attorney, Agent, or Firm—W. G. Fasse; D. H. Kane, Jr.

[57] ABSTRACT

The blade angle of the blades is adjustable in a rotor for a rotary wing aircraft by a lever mechanism (13, 14 or 41, 42) secured to the radially inner end of an extension bushing (7; 7.1) or shaft (43). The extension bushing (7; 7.1) or shaft (43) is connected with its radially outer lever (15 or 44) to the blade root (2) or a blade root mounting (39, 50) of a rotor blade in an angular position adjustable manner for adjusting the tracking of the blades. The bushing (7; 7.1) or shaft (43) is adjustable in its angular position relative to the blade root (2) by adjustment screws cooperating with a free end of the lever (15 or 44) which reaches into a gap between two of such adjustment screws (16 or 45) cooperating with counter nuts (17 or 46). By adjusting the angular position of the bushing or shaft with the screws it is possible to assure a uniform tracking among all the blades of a multiblade rotor. Such uniform tracking is desirable if the blades of a rotor are to rotate in the same plane.

6 Claims, 2 Drawing Figures

APPARATUS FOR ADJUSTING THE TRACKING OF THE BLADES IN A ROTOR, ESPECIALLY FOR A ROTARY WING AIRCRAFT

CLAIM TO PRIORITY

The present application is based on European Ser. Nos. 82 102 202.7 and 82 102 203.5 filed in the European Patent Office on Mar. 18, 1982. The priority of the European filing date is claimed for the present application.

BACKGROUND OF THE INVENTION

The invention relates to an apparatus for adjusting the tracking of the blades in a rotor, especially for a rotary wing aircraft. The term "tracking" in this context means that all blades of a multi-blade rotor, such as a helicopter rotor, rotate in the same plane when all blades are adjusted to the same blade angle and without any cyclical blade angle change.

As disclosed in German Pat. Nos. 1,531,355 and 2,150,741 rotors of this type do not require any separate mechanical flapping hinges nor any separate mechanical lead-lag hinges. Avoiding such hinges has the advantage that the useful life of such rotors is substantially increased because parts that are not needed do not break down. This feature in turn results in a smaller risk of damage. Additionally, it is possible to use the rotor hub as a protective housing, for example for the control means needed for the blade angle adjustment. Reference is made in this connection to German Pat. No. 2,658,828 in which the control rods for the blade angle adjustment are driven by a swash plate and connected to the radially inner end of the respective blade root sleeve. Such a structure for the blade angle adjustment is rather simple in a kinematic sense. However, there is no possibility for adjusting the so-called tracking through an external access to the rotor hub. After the rotor blades have been mounted to the rotor hub, such tracking of the blades relative to each other or relative to one another is desirable so that all blades may rotate in the same plane. However, to assure such tracking a fine adjustment of the blades is needed independently of the collective and uniform blade angle adjustment without regard to any cyclical blade angle adjustment.

The tracking adjustment involves a very fine adjustment of each blade about the longitudinal axis of a blade which extends in the radial direction relative to the rotational axis of the rotor. It must be possible to make the adjustment to the precise same angular degrees or even angular minutes for the individual rotor blades. Such adjustment must be possible after the original installation and also when bearings are required to be exchanged in the blade angle adjustment gear train.

German Pat. No. 3,006,088 describes a rotor with elastomeric bearings. At least one of such bearings is capable of taking up compression loads. Such rotors have the advantage that the rotor wings or blades may be tilted into a folded position. Further, such rotors also have a rotor hub functioning as a protective housing for the control mechanism used for the blade angle control.

OBJECTS OF THE INVENTION

In view of the above it is the aim of the invention to achieve the following objects singly or in combination:

to provide a simple always easily accessible apparatus for adjusting the blade tracking without the need, for example, of a positional adjustment of the control rods for the blade angle adjustment where such control rods are located inside the rotor hub;

to provide a fine adjustment which is easily performed manually to assure the required tracking adjustment of the individual rotor blades;

to construct the adjustment means in such a manner that they are not trouble prone; and to perform the tracking adjustment at a point where it is most effective, namely directly at the blade root.

SUMMARY OF THE INVENTION

The rotor blade tracking adjustment mechanism according to the invention is characterized in that a bushing is provided with an extension reaching through the blade root sleeve, whereby the inner end of the bushing extension is rigidly connected to the blade angle adjustment means while the radially outer ends of the bushing extension has a lever arm which reaches into cooperation with the blade root sleeve through adjustment means which permit the angular adjustment of the bushing relative to the sleeve and which also permit locking the bushing into its adjusted position after the adjustment has been made so that rotation of the bushing by the blade angle adjustment levers may be transmitted to the respective rotor tracking blades for the blade angle adjustment.

Thus, the invention takes advantage of the bushing which normally is rigidly held in the blade root sleeve, by supporting this bushing rotatably in the blade root sleeve and by providing it with a radially outer lever arm for easy angular position adjustment from the outside, and by using the radially inner extension of the bushing in the rotor hub for connection to the respective blade angle adjustment control rod located inside the rotor hub. Since the lever arm of the bushing is directly accessible by adjustment means which are in turn accessible externally of the rotor hub, the adjustment of the bushing may be performed without disturbing the rotor hub and any components inside the rotor hub. Simple position adjustable arresting means such as screws may thus be used for said tracking adjustment of the rotor blades.

In a rotor with elastomeric bearings the invention constructs the bearing stud of the blade root or rather of the blade root mounting as a sleeve or bushing type extension. A control shaft connected with its radially inner end to the blade angle control means extends rotatably through said sleeve or bushing extension and has a lever arm connected to its radially outer end. This lever arm reaches adjustably into cooperative contact with the blade root or a blade root mounting for the tracking adjustment. Once the tracking adjustment has been made, the lever arm is locked in its position relative to the blade root or blade root mounting for permitting the blade angle adjustment.

BRIEF FIGURE DESCRIPTION

Figure 2:
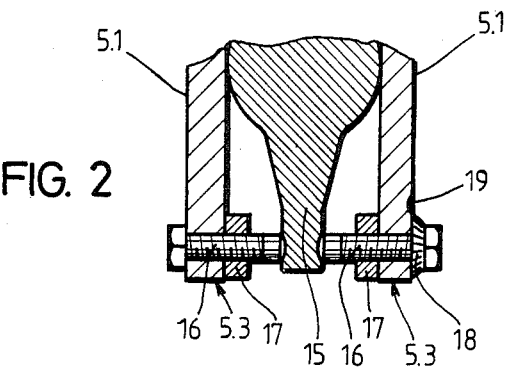

In order that the invention may be clearly understood, it will now be described, by way of example, with reference to the accompanying drawings, wherein:

FIG. 1 is a sectional view through a portion of a rotor hub with roller bearings for the blade root and showing part of the radially inner end of one rotor blade, whereby the sectional plane extends perpendicularly to the rotational axis of the rotor hub, said rotational axis extending perpendicularly to the plane of the drawing; and FIG. 2 is a sectional view along section line 2—2 in FIG. 1.

DETAILED DESCRIPTION OF PREFERRED EXAMPLE EMBODIMENTS AND OF THE BEST MODE OF THE INVENTION

As in the structure of the above mentioned German Pat. No. 2,658,828, the rotor hub 1 according to the invention is also constructed as a protective housing for the blade angle adjustment means (13, 14). The rotor hub 1 is provided with at least two and possibly more rotor hub arms 1.1 extending radially away from the rotor hub and being hollow for receiving a blade root sleeve 5. Such structural detail is shown in the above mentioned German Pat. No. 2,150,741. The blade root 2 is connected to the blade root sleeve 5 or rather to two legs 5.1 of the sleeve 5 by means of bolts 6. Thus, the blade root sleeve forms a mounting for the blade root 2. The blade root sleeve 5 is rotatably supported in the respective hollow rotor hub arm 1.1 by anti-friction bearings 3 and 4. The just mentioned blade root legs 5.1 are spaced from each other and extend substantially in parallel to each other as best seen in FIG. 2, thereby simultaneously forming a socket type of holding means for the blade root 2. Additionally, this spacing provides room for accommodating an adjustment lever 15, as will be described in more detail below.

The blade root sleeve 5 and the anti-friction or roller bearings 3 and 4 permit introducing any moments resulting from blade flapping movements and from blade lead-lag movements into the rotor hub arm 1.1 and thus also into the rotor hub 1.

According to the invention the blade angle adjustment bushing 7 is rotatably supported inside the blade root sleeve 5. This bushing 7 holds the blade root sleeve 5 against radially effective tension loads such as centrifugal forces. For this purpose the bushing 7 is secured against radially effective forces to the central body 10 of the hub 1 by a tension element 9. The radially inner end of the tension element 9 is secured to the central body 10 by a connecting bolt 11. The radially outer end of the tension element 9 is connected to the bushing 7 by a bolt 8. The tension element 9 is strong against tension loads, but capable of yielding against torque moments applied to the tension element 9 to the extent necessary for permitting the blade angle adjustment and the tracking adjustment as will be described in more detail below. Preferably, the tension element 9 is constructed as an endless belt of lamellae, for example, of fiber compound materials. The central body 10 is provided with a number of bolts 11 which correspond to the number of rotor blades. Further, the blade root sleeve 5 is provided with an inwardly reaching arresting shoulder 5.2 resting against a respective outwardly reaching arresting shoulder 5.2' of the bushing 7. The arresting shoulders 5.2 and 5.2' are so located that the bushing 7 with the tension element 9 restrains the blade root sleeve 5 against radial forces which are effective in the direction of the longitudinal axis of a blade more specifically against centrifugal forces.

According to the invention the bushing 7 is provided with an extension 7.1 reaching radially inwardly out of the hub arm 1.1 sufficiently for connection to a ring end 14' of the blade angle adjustment lever 14. The ring end 14' of the lever 14 and the radially inner end of the bushing extension 7.1 are preferably provided with splines 20 for transmitting torque moments from the lever 14 to the bushing 7 through the bushing extension 7.1. Additionally, the lever end 14' is secured by a threaded nut 21. For the blade angle adjustment the lever 14 is movable by a control rod 13 and the movement of the control rod 13 is transmitted through the just described elements since the bushing extension 7.1 acts as a control shaft for the blade angle adjustment as long as the radially outer lever arm 15 forming preferably an integral part of the bushing 7 is held in a rigid position relative to the legs 5.1 of the blade root sleeve 5.

However, the bushing 7 with its extension 7.1 may also be adjusted in its angular position relative to the blade root sleeve 5 by the adjustment means shown in more detail in FIG. 2.

Referring to FIG. 2, the above mentioned tracking adjustment is possible due to the relative movement between the lever arm 15 of the bushing 7 and the blade root sleeve 5 when the screws 16 reaching through threaded holes in the legs 5.1 of the blade root sleeve 5 are released. The free end of the lever 15 reaches into the gap between the inner ends of the adjustment screws 16. If desired, the legs 5.1 may be provided with a downward projection 5.3 to facilitate the easy access to the heads of the adjustment screws 16. Preferably, at least one of the screws 16 is provided with an angular scale 18 arranged for cooperation with a marker 19 on the respective leg 5.1. Once the adjustment of the relative position between the lever 15 and the legs 5.1 is accomplished, the counternuts 17 are tightened on the screws 16, whereupon any blade angle adjustment movements are transmitted through the bushing extension 7.1 and the bushing 7 as well as the lever 15.

In view of the above it will be appreciated that the external access to the adjustment screws 16 greatly facilitates such adjustment and makes it very simple. Further, once the adjusted screws 16 are tightened by the counter nuts 17, it is assured that any movements of the control rods 13 driven by a conventional swash plate (not shown) are properly transmitted for the blade angle adjustment.

Although the invention has been described with reference to specific example embodiments it will be appreciated that it is intended to cover all modifications and equivalents within the scope of the appended claims.

What is claimed is:

1. An apparatus for adjusting the tracking of a plurality of blades in a rotor, especially for a rotary wing aircraft, comprising a hollow rotor hub (1) defining a rotational axis and including a central hub body (10) and a hollow rotor hub arm (1.1) for each blade, said hollow rotor hub arms extending radially relative to said rotational axis, each of said blades having a longitudinal blade axis extending radially relative to said rotational axis, each blade further comprising a blade root and a blade root sleeve (5) connected to said blade root and extending through its respective one of said rotor hub arms, bearing means (3, 4) rotatably supporting said blade root sleeve (5) in its rotor hub arm (1.1), first blade angle adjustment means (7, 7.1) extending rotatably through said blade root sleeve into said hub, axially effective arresting means (5.2, 5.2') between said blade root sleeve (5) and said first blade angle adjustment means (7, 7.1) for restraining relative axial movement between said blade root sleeve and said first blade angle adjustment means, tension means (9) yielding to torsional loads securing said first blade angle adjustment means to said central hub body (10) for locking said blade to said rotor hub against centrifugal forces but permitting blade adjustments about said longitudinal blade axis inside said blade root sleeve (5), second blade angle adjustment means (13, 14) operatively located in said hollow hub (1) and including means operatively connecting said second blade angle adjustment means to said first blade angle adjustment means inside said hollow rotor hub, said first blade angle adjustment means (7, 7.1) comprising a radially outer end extending out of said blade root sleeve (5) and an adjustment lever arm (15) connected to said radially outer end, said apparatus further comprising adjustable locking means (16) operatively interposed between said adjustment lever arm (15) and said blade root for permitting a rotational adjustment of said first blade angle adjustment means by rotating said adjustment lever arm and then locking said adjustment lever arm in an adjusted position.

2. The apparatus of claim 1, wherein said first blade angle adjustment means comprise a hollow bushing (7, 7.1) extending coaxially through said blade root sleeve (5) and having a radially inner open end inside said hollow rotor hub, said hollow bushing further having a radially outer end extending out of said blade root sleeve (5), said adjustment lever arm being connected to said radially outer end of said hollow bushing (7, 7.1) for providing easy access to said adjustment lever arm, said tension means (9) extending longitudinally through said hollow bushing, said tension means having a radially inner end and a radially outer end, and connector elements (11, 8) securing said radially inner end of said tension means (9) to said central hub body (10) and said radially outer end of said tension means (9) to said hollow bushing (7) substantially at a radially outer end of said hollow bushing (7).

3. The apparatus of claim 1, wherein, said first blade angle adjustment means comprise an extension bushing (7, 7.1) extending coaxially in said blade root sleeve (5), said blade root sleeve (5) comprising two radially outer legs (5.1) extending substantially in parallel to each other and connected to said blade root, said two legs providing a spacing between said legs, said adjustment lever arm (15) of said extension bushing being located in said spacing, each of said legs comprising a threaded hole, said adjustable locking means comprising at least two adjustment screws (16) extending in opposing relationship relative to each other through said threaded holes in the respective leg (5.1) of the blade root sleeve (5) so that inner ends of said adjustment screws contact said adjustment lever arm (15) of said blade root sleeve (5) for rotatably adjusting the position of said adjustment lever arm (15) in said spacing and for fixing the adjusted position of said adjustment lever (15) in said spacing.

4. The apparatus of claim 3, wherein said screws comprise counter nuts (17) for cooperation with the respective adjustment screw in the corresponding leg (5.1) of the blade root sleeve (5).

5. The apparatus of claim 3, wherein at least one of said adjustment screws has a screw head with an angular adjustment scale (18) thereon, and wherein the respective leg of the blade root sleeve has a marker (19) thereon for cooperation with said angular adjustment scale (18).

6. The apparatus of claim 1, wherein said adjustment lever arm (15) extends substantially at a right angle relative to the radial direction and forms an integral part of said first blade angle adjustment means (7, 7.1).

* * * * *